US012461801B2

(12) United States Patent
Ottar et al.

(10) Patent No.: US 12,461,801 B2
(45) Date of Patent: Nov. 4, 2025

(54) DEVICE HEALTH MANAGEMENT USING A MANAGEMENT CONTROLLER OF A DATA PROCESSING SYSTEM

(71) Applicant: Dell Products L.P., Round Rock, TX (US)

(72) Inventors: Vinodkumar Vasudev Ottar, McKinney, TX (US); Rajaravi Chandra Kollarapu, Allen, TX (US); Bassem El-Azzami, Austin, TX (US); Luis Antonio Valencia Reyes, Waxahachie, TX (US); Abeye Teshome, Austin, TX (US); Mohit Arora, Frisco, TX (US); Adolfo Sandor Montero, Pflugerville, TX (US); Richard M. Tonry, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/649,158

(22) Filed: Apr. 29, 2024

(65) Prior Publication Data

US 2025/0335275 A1 Oct. 30, 2025

(51) Int. Cl.
  *G06F 11/00* (2006.01)
(52) U.S. Cl.
  CPC ........ *G06F 11/004* (2013.01); *G06F 2201/81* (2013.01)
(58) Field of Classification Search
  CPC .................................................. G06F 11/004
  See application file for complete search history.

(56) References Cited

U.S. PATENT DOCUMENTS

| 7,969,909 B2 | 6/2011 | Oerton |
| 8,042,182 B2 | 10/2011 | Milani Comparetti et al. |

(Continued)

FOREIGN PATENT DOCUMENTS

| CN | 101393543 A | * 3/2009 | .......... G05B 23/024 |
| CN | 105530121 A | 4/2016 | |

(Continued)

OTHER PUBLICATIONS

Latvala et al., "Evaluation of Out-of-Brand Channels for IoT Security", SN Computer Science, pp. 1-17 (Year: 2020).

*Primary Examiner* — Amine Riad
(74) *Attorney, Agent, or Firm* — WOMBLE BOND DICKINSON (US) LLP

(57) ABSTRACT

Methods and systems for managing operations of a data processing system are disclosed. To manage operations of the data processing system, a management controller of the data processing system may obtain diagnostic data from hardware resources of the data processing system. The management controller may provide the diagnostic data to a device operation manager. The management controller may obtain a response from the device operation manager indicating a level of anomalousness of the diagnostic data with respect to a baseline for the data processing system. In a first instance of the obtaining where the level of anomalousness meets criteria, the management controller may obtain an action set for updating the operation of the data processing system. The management controller may perform the action set to update an existing operating state of the data processing system to reduce a likelihood that a hardware resource becomes impaired.

20 Claims, 6 Drawing Sheets

(56) References Cited

U.S. PATENT DOCUMENTS

| | | | |
|---|---|---|---|
| 8,477,647 B2 | 7/2013 | Tamura | |
| 8,533,345 B2 | 9/2013 | Fedotenko | |
| 8,538,023 B2 | 9/2013 | Yao | |
| 8,615,785 B2 | 12/2013 | Elrod et al. | |
| 8,924,620 B2 | 12/2014 | Harriman et al. | |
| 9,215,244 B2 | 12/2015 | Ayyagari et al. | |
| 9,319,967 B2 | 4/2016 | Jonker | |
| 9,413,783 B1 | 8/2016 | Keogh | |
| 9,734,169 B2 | 8/2017 | Redlich et al. | |
| 9,980,213 B2 | 5/2018 | Lynch | |
| 10,176,308 B2 | 1/2019 | Mintz et al. | |
| 10,298,670 B2 | 5/2019 | Ben-Shael et al. | |
| 10,341,939 B2 | 7/2019 | Peng | |
| 10,362,608 B2 | 7/2019 | Gorajala Chandra | |
| 10,621,061 B2* | 4/2020 | Kalech | G06F 11/0766 |
| 10,671,765 B2 | 6/2020 | Swierk et al. | |
| 11,036,902 B2 | 6/2021 | Nicholas | |
| 11,102,122 B2 | 8/2021 | Seed et al. | |
| 11,134,380 B2 | 9/2021 | Fox et al. | |
| 11,399,283 B2 | 7/2022 | Anantha | |
| 11,487,274 B2 | 11/2022 | Valder et al. | |
| 11,792,267 B2 | 10/2023 | Kreiner et al. | |
| 12,034,765 B1 | 7/2024 | Barkan | |
| 12,302,236 B2 | 5/2025 | Grayson | |
| 2002/0199120 A1 | 12/2002 | Schmidt | |
| 2009/0197571 A1 | 8/2009 | Kitajima | |
| 2010/0083381 A1 | 4/2010 | Khosravi | |
| 2010/0169949 A1 | 7/2010 | Rothman | |
| 2011/0087387 A1 | 4/2011 | Safa-Bakhsh et al. | |
| 2011/0119765 A1 | 5/2011 | Hering | |
| 2013/0152161 A1 | 6/2013 | Onno | |
| 2014/0366105 A1 | 12/2014 | Bradley | |
| 2016/0345171 A1 | 11/2016 | Kulkarni | |
| 2017/0063932 A1 | 3/2017 | Hubbard | |
| 2017/0244753 A1 | 8/2017 | Hu | |
| 2018/0039946 A1 | 2/2018 | Bolte et al. | |
| 2018/0082066 A1 | 3/2018 | Munjal | |
| 2018/0176215 A1 | 6/2018 | Perotti | |
| 2019/0294782 A1 | 9/2019 | Cudak | |
| 2020/0092251 A1 | 3/2020 | Peterson | |
| 2020/0366754 A1 | 11/2020 | Wang | |
| 2021/0034048 A1 | 2/2021 | Hajizadeh | |
| 2021/0073211 A1 | 3/2021 | Wright, Sr. | |
| 2021/0200654 A1* | 7/2021 | Elmtalab | G06F 12/0246 |
| 2021/0211450 A1 | 7/2021 | Aleidan | |
| 2021/0258808 A1 | 8/2021 | Mahimkar | |
| 2021/0382635 A1 | 12/2021 | Ma | |
| 2022/0038659 A1 | 2/2022 | Michel | |
| 2022/0300960 A1 | 9/2022 | Gutzeit | |
| 2023/0027152 A1 | 1/2023 | Doshi | |
| 2023/0412619 A1 | 12/2023 | Tshouva | |
| 2024/0069808 A1 | 2/2024 | Bukhari | |
| 2024/0411635 A1* | 12/2024 | Shao | G06F 11/3089 |
| 2025/0138839 A1 | 5/2025 | Teshome | |
| 2025/0138945 A1 | 5/2025 | Teshome | |
| 2025/0139298 A1 | 5/2025 | Ottar | |
| 2025/0141814 A1 | 5/2025 | Montero | |
| 2025/0141880 A1 | 5/2025 | Teshome | |
| 2025/0142444 A1 | 5/2025 | Arora | |
| 2025/0245059 A1 | 7/2025 | Kollarapu | |
| 2025/0245353 A1 | 7/2025 | Montero | |
| 2025/0247670 A1 | 7/2025 | Montero | |
| 2025/0247703 A1 | 7/2025 | El-Azzami | |

FOREIGN PATENT DOCUMENTS

| | | |
|---|---|---|
| CN | 109756797 A | 5/2019 |
| CN | 113221197 A | 8/2021 |
| CN | 117439758 A | 1/2024 |
| EP | 4535743 A1 | 4/2025 |

* cited by examiner

DEVICE HEALTH MANAGEMENT USING A MANAGEMENT CONTROLLER OF A DATA PROCESSING SYSTEM

FIELD

Embodiments disclosed herein relate generally to managing a data processing system. More particularly, embodiments disclosed herein relate to systems and methods for managing device health using a management controller of a data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
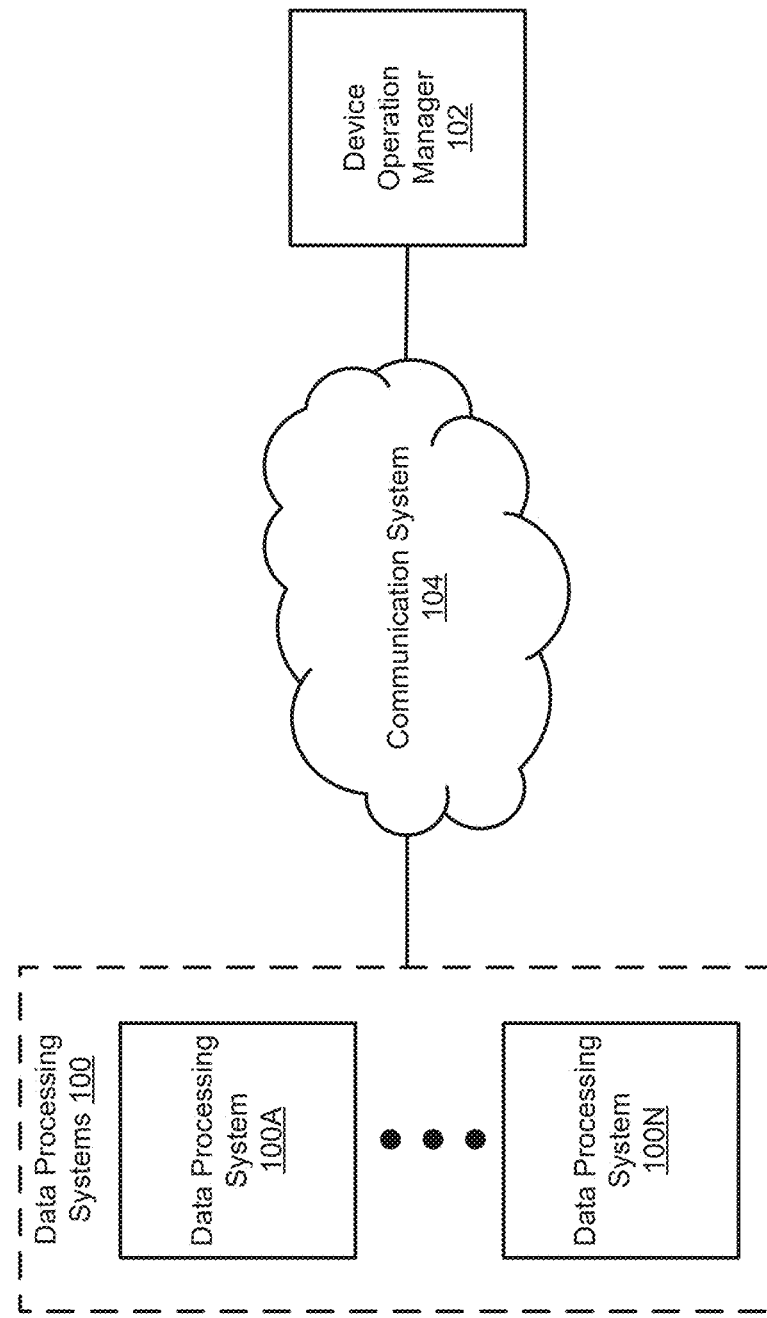
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing device health of a data processing system. As part of providing computer-implemented services, the data processing system may include any number of in-band hardware resources (e.g., a hard drive, a memory module, a processor). Additionally, the data processing system may include out-of-band components such as a management controller, which may collect, analyze, and transmit data (e.g., to a server) without traversing in-band components of the data processing system.

The management controller may provide device health management services for the data processing system. For example, the management controller may collect diagnostic data regarding the performance, utilization, and/or health of the hardware resources. Because the management controller operates using out-of-band components, the management controller may selectively power hardware resources while the hardware resources are unpowered in order to obtain the diagnostic data. The management controller may provide the diagnostic data to a device operation manager (e.g., a server) which may host an inference model.

The inference model may be trained using first diagnostic data from the data processing system collected during manufacturing of the data processing system to establish a baseline for the data processing system. The baseline may be updated over a duration of time using second diagnostic data collected after manufacturing. The inference model may be trained to generate inferences regarding the anomalousness of third diagnostic data, the anomalousness indicating a deviation of the third diagnostic data from the baseline. A deviation of the third diagnostic data from the baseline may indicate a hardware resource is likely to become impaired (e.g., lose a portion of functionality).

The management controller may obtain a response from the device operation manager including the inferences indicating a level of anomalousness of the diagnostic data. If the level of anomalousness meets criteria, the data processing system may be likely to suffer from undesired operation in the future. To reduce the likelihood that the data processing system suffers from undesired operation in the future, the management controller may perform an action set to update operation of the data processing system.

Thus, embodiments disclosed herein may address, among other technical problems, the technical challenge of providing device health management services using an inference model via out-of-band methods. By providing the diagnostic data to the device operation manager using out-of-band components and without traversing potentially compromised and/or inoperable in-band components, the device health management services may be provided reliably and consistently. The management controller may then update the operating state of the data processing system to reduce the likelihood that a hardware resource becomes impaired, resulting in the data processing system being more likely to continue to provide the computer-implemented services.

In an embodiment, a method for managing operation of a data processing system is disclosed. The method may include: obtaining, by a management controller of the data processing system from hardware resources of the data processing system, diagnostic data; providing, by the management controller, the diagnostic data to a device operation manager; obtaining, by the management controller, a response from the device operation manager based on the diagnostic data, the response indicating a level of anomalousness of the diagnostic data with respect to a baseline for the data processing system; and in a first instance of the obtaining where the level of anomalousness meets a criteria:

obtaining, by the management controller, an action set for updating the operation of the data processing system; and performing, by the management controller, the action set to update an existing operating state of the data processing system to a new operating state of the data processing system to reduce a likelihood that a hardware resource of the hardware resources becomes impaired.

The diagnostic data may include at least one type of data selected from a list of types of data consisting of: data regarding performance metrics based on operation of the hardware resources; data regarding hardware resource utilization metrics; and data regarding hardware resource health.

Obtaining the diagnostic data may include selectively powering the hardware resources by the management controller while the hardware resources are unpowered.

The response may be based on an inference model, and the inference model may be based on the baseline for the data processing system using second diagnostic data collected during manufacturing of the data processing system.

The baseline for the data processing system may be updated over a duration of time based on third diagnostic data collected after manufacturing of the data processing system.

The inference model may be trained to generate inferences regarding the anomalousness of the diagnostic data from the data processing system, the anomalousness indicating a deviation of the diagnostic data from the baseline.

The criteria may indicate a threshold level of anomalousness for comparison to an inference from the response, and the inference, when meeting the threshold level of anomalousness, may indicate that the data processing system is likely to suffer from undesired operation in the future.

The action set may include at least one action selected from a group of actions consisting of: generating a notification to alert a user of the data processing system to the level of anomalousness indicated by the diagnostic data; moving data stored on a hardware resource indicated in an inference from the response as exhibiting a level of anomalousness to a hardware resource not exhibiting a level of anomalousness; providing a copy of the data stored on the hardware resource indicated in an inference from the response as exhibiting a level of anomalousness to the device operation manager; and modifying use of the hardware resource indicated in an inference from the response as exhibiting a level of anomalousness.

The criteria may include a plurality of threshold levels of anomalousness, and each threshold level of anomalousness of the plurality of threshold levels of anomalousness is associated with at least one action, and the action set is established based on a portion of the plurality of threshold levels of anomalousness that are met by the diagnostic data.

The data processing system may include a network module adapted to separately advertise network endpoints for the management controller and hardware resources of the data processing system, the network endpoints being usable by the device operation manager to address communications to the hardware resources using an in-band communication channel and the management controller using the out-of-band communication channel.

The management controller and the network module may be on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services. The computer-implemented services may include any type and quantity of services including, for example, data services (e.g., data storage, access and/or control services), communication services (e.g., instant messaging services, video-conferencing services), and/or any other type of service that may be implemented with a computing device. The computer-implemented services may be provided by, for example, data processing systems 100, device operation manager 102, and/or any other type of devices (not shown in FIG. 1A). Other types of computer-implemented services may be provided by the system shown in FIG. 1A without departing from embodiments disclosed herein.

The system may include any number and/or type of data processing systems 100 (e.g., 100A-100N). Data processing systems 100 may include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time.

As part of providing the computer-implemented services, hardware components of a data processing system (e.g., data processing system 100A) may include, for example, a hard drive. The hard drive of data processing system 100A may provide storage services for data processing system 100A. To provide the storage services, the hard drive may (i) write data (e.g., user files, operating systems) to disk sectors within the hard drive for storage, (ii) read data from disk sectors, and/or (iii) perform other tasks to provide storage services for data processing system 100A.

Operation of and/or computer-related services provided by data processing system 100A may be negatively impacted if the hard drive becomes compromised and/or inoperable. For example, as part of routine operation of data processing system 100A, some disk sectors of the hard drive may become physically damaged (e.g., due to normal wear and tear, dust entering the hard drive). Damaged disk sectors may be unable to store data and thus become unable to assist in providing the storage services for data processing system 100A.

While the hard drive may be able to continue to provide the storage services with some damaged disk sectors (e.g., by avoiding use of the damaged disk sectors), an increasing number of damaged disk sectors may indicate the hard drive is at risk of failure. Hard drive failure may result in (i)

permanent loss of data, (ii) data processing system 100A being unable to boot up (e.g., due to no longer being able to read the operating system), and/or (iii) other outcomes which may negatively impact the operation of data processing system 100A. As a result of hard drive failure, data processing system 100A may become inoperable and unable to provide any and/or a portion of the computer-implemented services.

While described with respect to a hard drive, it will be appreciated that other hardware components may also become impaired, which may result in other negative outcomes with regards to the operation of data processing system 100A and the computer-implemented services.

In general, embodiments disclosed herein may provide methods, systems, and/or devices for managing device health of a data processing system. To manage the device health of a data processing system, diagnostic data for the data processing system may be obtained by a management controller of the data processing system from hardware resources of the data processing system and provided to a device operation manager (e.g., a server). The device operation manager may host an inference model, which may be based on a baseline for the data processing system established using diagnostic data collected during manufacturing of the data processing system. The baseline may be updated over time using diagnostic data collected after manufacturing of the data processing system.

The inference model may generate inferences regarding the anomalousness of the diagnostic data, the anomalousness indicating a deviation of the diagnostic data from the baseline. The inferences may be provided to the management controller in a response. If the anomalousness meets criteria, which may include a plurality of threshold levels of anomalousness, an action set may be performed by the management controller based on the threshold level of anomalousness. Performing the action set may reduce a likelihood that a hardware resource of the data processing system becomes impaired (e.g., loses a portion of functionality).

The management controller may operate and communicate with the device operation manager using out-of-band components without traversing in-band communication channels and without utilizing in-band components. By operating using out-of-band components, the management controller may selectively power hardware resources while the hardware resources are unpowered in order to obtain diagnostic data. The diagnostic data may also be provided to the device operation manager while the hardware resources are unpowered, allowing for the diagnostic data to be monitored without relying on the hardware resources being operational.

By doing so, a system in accordance with an embodiment may increase the likelihood of detecting compromised hardware resources, alerting a user of the data processing system to the compromised hardware resources, and performing actions to reduce further damage to hardware resources. Early detection of compromised hardware resources may allow the hardware resources to be repaired and/or for data stored on the compromised hardware resources to be moved, which may allow the computer-implemented services to be provided reliably and without delays.

To perform the above-mentioned functionality, the system of FIG. 1A may include data processing systems 100, and/or device operation manager 102. Data processing systems 100, device operation manager 102, and/or any other type of devices not shown in FIG. 1A may perform all, or a portion of the computer-implemented services independently and/or cooperatively. Each of these components is discussed below.

Data processing systems 100 may include any number and/or type of data processing systems (e.g., 100A-100N). Data processing systems 100 may include out-of-band components (e.g., a network module, a management controller) and functionality that may allow data exchange between the out-of-band components independently from in-band components (e.g., hardware resources) of data processing systems 100. For more information regarding out-of-band components of data processing systems 100, refer to the discussion of FIG. 1B.

The management controller of a data processing system (e.g., data processing system 100A) may provide device health management services for the data processing system. To provide the device health management services, the management controller may (i) obtain diagnostic data from hardware resources of data processing system 100A, (ii) process and/or transform the diagnostic data, (iii) provide the diagnostic data to a device operation manager via out-of-band communication channels, (iv) obtain data (e.g., computing instructions) from the device operation manager in response, (v) facilitate updating of the operation of data processing system 100A (e.g., based on the computing instructions), and/or (vi) perform other actions related to providing device health management services. Data processing system 100A may provide diagnostic data to a device operation manager (e.g., device operation manager 102), which may participate in managing operation of data processing system 100A.

Device operation manager 102 may include any number and/or type of remote devices (e.g., other data processing systems, servers, management systems, storage devices, user devices) that may provide computer-implemented services (e.g., device health management services, location-based services, device management services). To perform its functionality, device operation manager 102 may communicate (e.g., exchange data) with the out-of-band components of data processing systems 100 using out-of-band communication channels. For example, device operation manager 102 may provide device health management services for data processing system 100A via the management controller of data processing system 100A (e.g., bypassing any in-band components of data processing system 100A).

To provide the device health management services, device operation manager 102 may (i) obtain diagnostic data (e.g., via out-of-band communication channels from the management controller of data processing system 100A), (ii) monitor, manage and/or store the diagnostic data (e.g., in a repository, not shown), (iii) process and/or transform the diagnostic data, (iv) aggregate the diagnostic data, (v) use the diagnostic data as training data for an inference model, (vi) use the diagnostic data as ingest for the inference model, (vii) provide responses to data processing system 100A (e.g., computing instructions based on the output of the inference model) and/or (vii) perform other tasks related to providing device health management services.

Thus, device health management services for data processing systems 100 may be provided using out-of-band methods (e.g., using out-of-band components and/or via out-of-band communication channels). By doing so, the operation of data processing systems 100 may be monitored and/or updated without relying on potentially compromised and/or inoperable in-band components. Device health monitoring via out-of-band methods may result in the detection of hardware resource health issues before the hardware resource fails. Early detection of health issues may allow for actions to be taken to improve the hardware resource health, which may result in the computer-implemented services provided by data processing systems 100 being less likely to be delayed, interrupted, and/or compromised.

Figure 3:
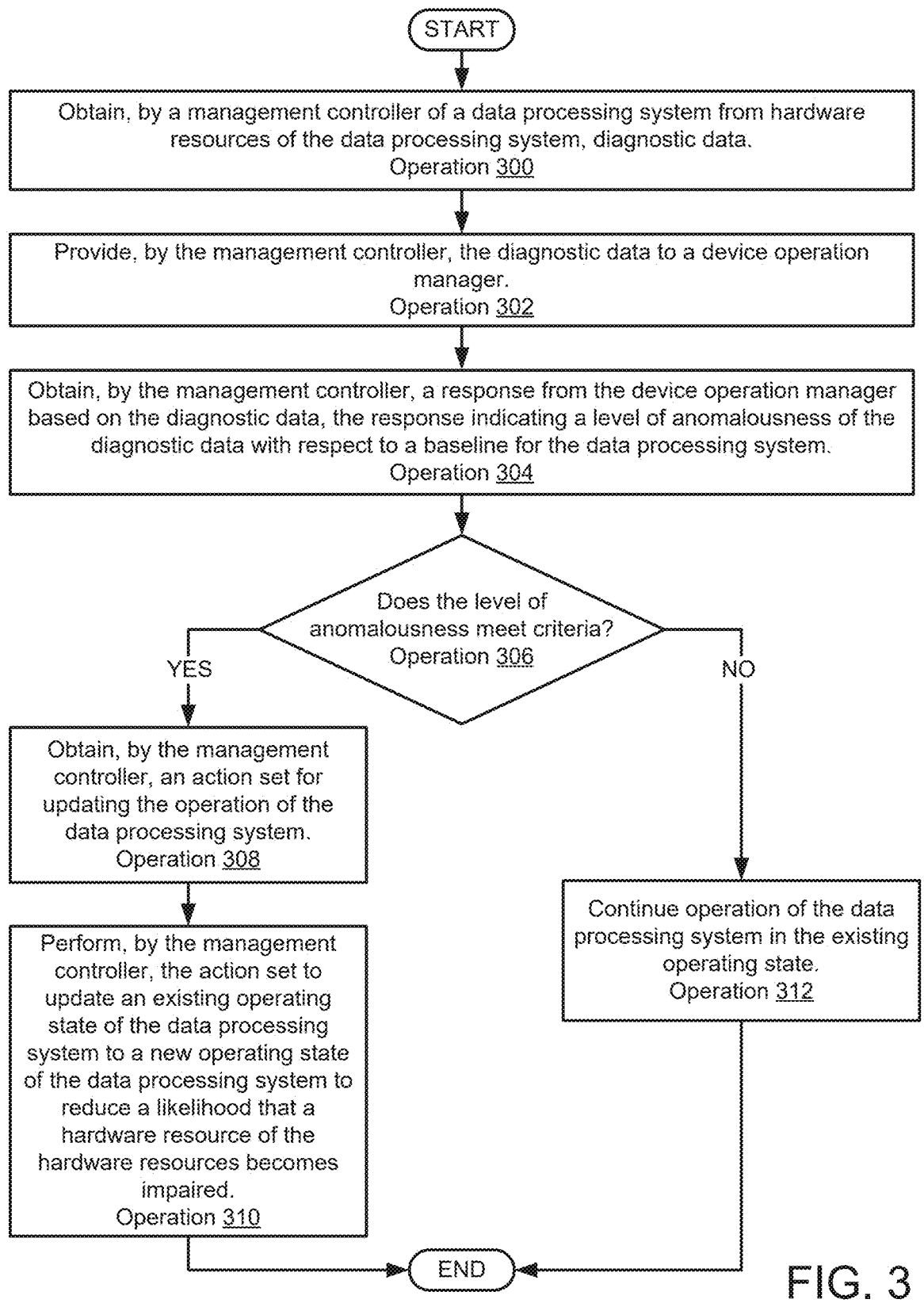
FIG. 3 shows a flow diagram illustrating a method of managing a data processing system in accordance with an embodiment.

When providing their functionality, any of data processing systems 100 and/or device operation manager 102 may perform all, or a portion of the methods shown in FIG. 3.

Any of (and/or components thereof) data processing systems 100 and/or device operation manager 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to FIG. 4.

In an embodiment, one or more of data processing systems 100 and/or device operation manager 102 are implemented using an internet of things (IoT) device, which may include a computing device. The IoT device may operate in accordance with a communication model and/or management model known to data processing systems 100, device operation manager 102, and/or other devices.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single device operation manager (e.g., 102), it will be appreciated that the system may include any number of device operation managers.

Figure 1B:
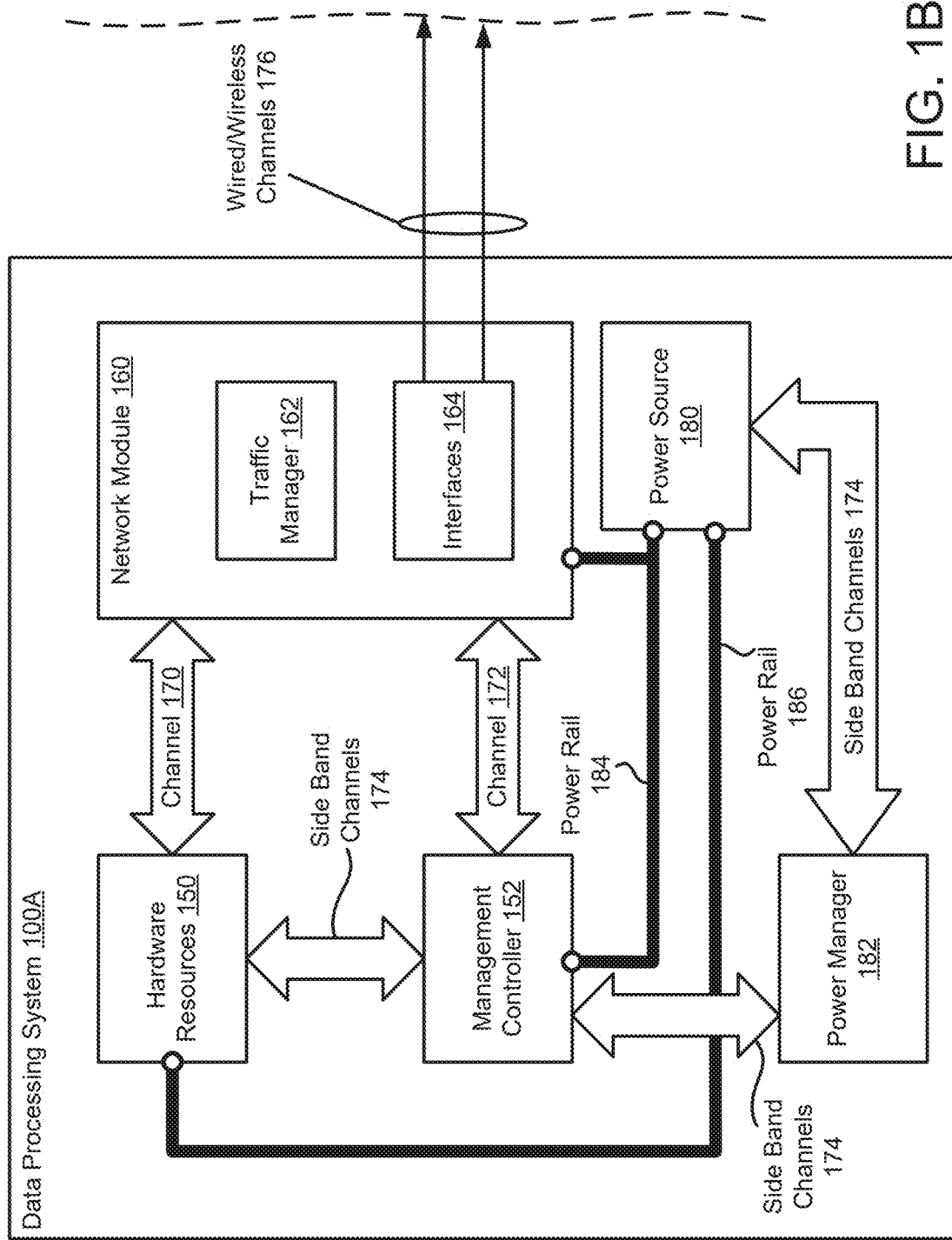
FIG. 1B shows a second block diagram illustrating a data processing system in accordance with an embodiment.

Turning to FIG. 1B, a diagram illustrating data processing system 100A in accordance with an embodiment is shown. Data processing system 100A may be similar to any of the data processing systems shown in FIG. 1A.

To provide computer implemented services, data processing system 100A may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100A) to another device via any number of intermediate networks (e.g., via wired/wireless channels 176 that are part of the networks).

To reduce the likelihood of the applications and/or other in-band entities from being indirectly compromised, data processing system 100A may include management controller 152 and network module 160. Each of these components of data processing system 100A is discussed below.

Management controller 152 may be implemented, for example, using a system on a chip or other type of independently operating computing device (e.g., independent from the in-band components, such as hardware resources 150, of a host data processing system 100A). Management controller 152 may provide various management functionalities for data processing system 100A. For example, management controller 152 may monitor various ongoing processes performed by the in-band component, may manage power distribution, thermal management, and/or other functions of data processing system 100A.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly processes may be used to facilitate outbound communications from the applications.

Management controller 152 may be operably connected to communication components of data processing system 100A via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 100A may include network module 160. Network module 160 may provide communication services for in-band components and out-of-band components (e.g., management controller 152) of data processing system 100A. To do so, network module 160 may include traffic manager 162 and interfaces 164.

Traffic manager 162 may include functionality to (i) discriminate traffic directed to various network endpoints advertised by data processing system 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 100A may appear to be two independent network entities, that may independently addressable, and otherwise unrelated to one another.

To facilitate management of data processing system 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

For example, management controller 152 may perform device health management services for data processing system 100A. Performing the device health management services may include selectively powering each hardware resource of hardware resources 150 (e.g., a hard drive, a memory module) while hardware resources 150 is unpowered. By doing so, management controller 152 may collect data (e.g., data regarding hardware resource health) from each of the hardware resources individually, which may assist in the identification of compromised hardware resources.

To implement the separate power domains, data processing system 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
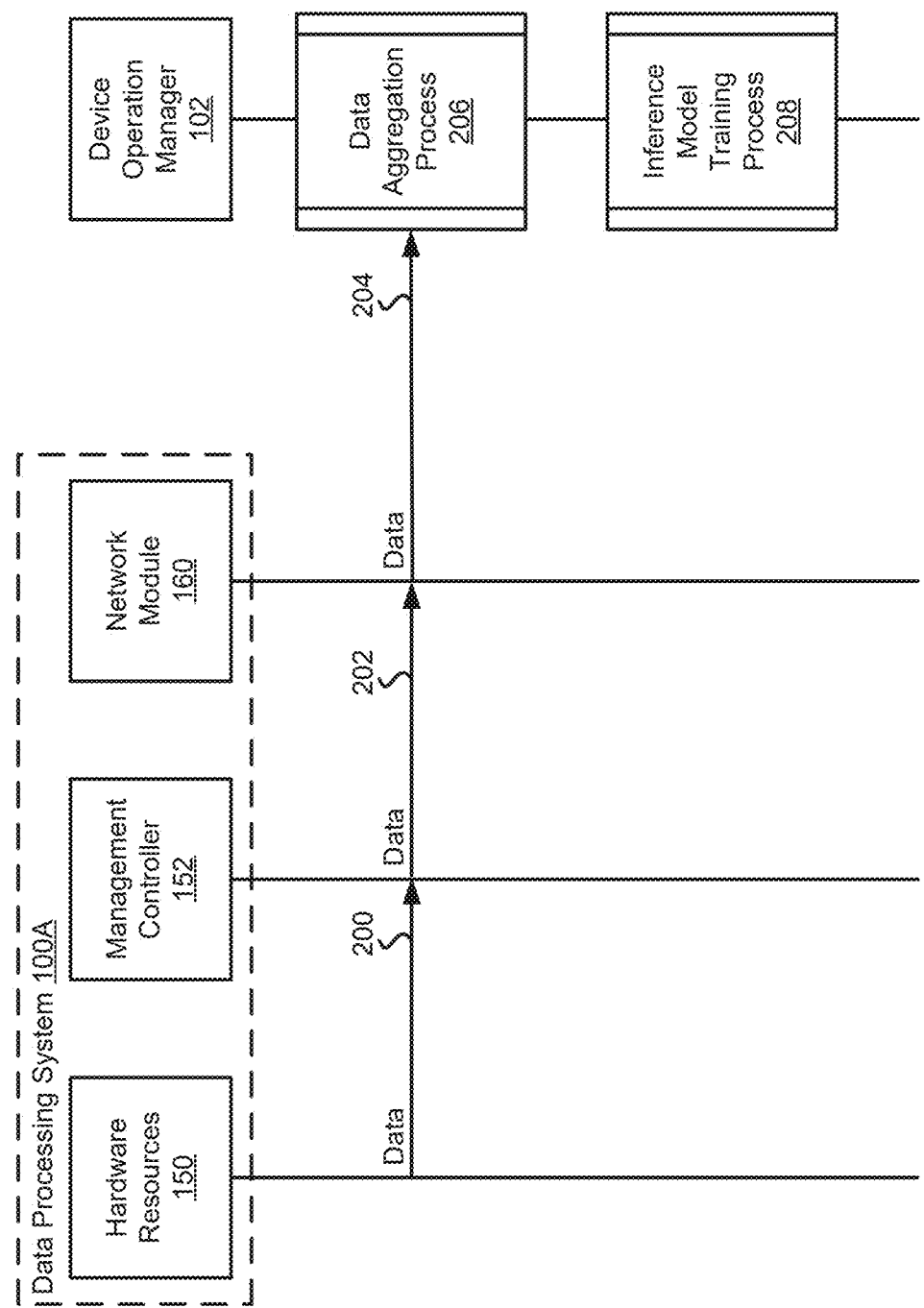
FIGS. 2A-2B show interaction diagrams in accordance with an embodiment.
Figure 2B:
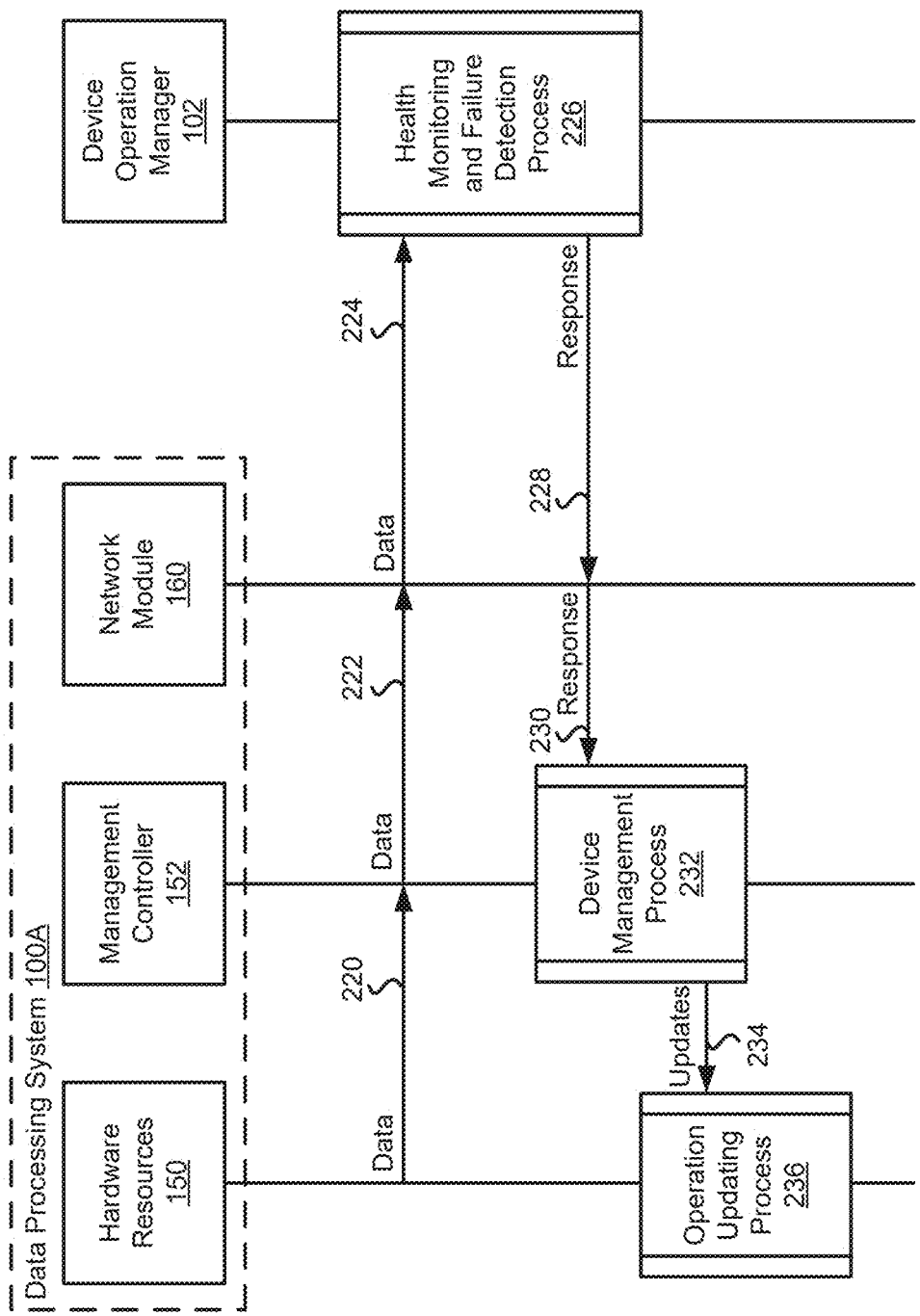

When providing its functionality, management controller 152 may perform all, or a portion, of the methods and operations described in FIGS. 2A-2B.

While illustrated in FIG. 1B with a limited number of specific components, a system may include additional, fewer, and/or different components without departing from embodiments disclosed herein.

To further clarify embodiments disclosed herein, interaction diagrams in accordance with an embodiment are shown in FIGS. 2A-2B. The interaction diagrams may illustrate examples of how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 150, 152, etc.), located towards the top of each figure. Lines descend from these shapes. Processes performed by the components of the system are illustrated using a second set of shapes (e.g., 206, 208, etc.) superimposed over these lines.

Interactions (e.g., communication, data transmissions, etc.) between the components of the system are illustrated using a third set of shapes (e.g., 200, 202, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 200 may occur prior to the interaction labeled as 202. However, it will be appreciated that the processes and interactions may be performed in different orders, any may be omitted, and other processes or interactions may be performed without departing from embodiments disclosed herein.

The processes shown in FIGS. 2A-2B may be performed by any entity shown in the systems of FIGS. 1A-1B (e.g., a device similar data processing system 100A, a device similar to device operation manager 102, etc.) and/or another entity without departing from embodiments disclosed herein.

Turning to FIG. 2A, a first interaction diagram in accordance with an embodiment is shown. The first interaction diagram may illustrate processes and interactions that may occur during training of an inference model used by a device operation manager (e.g., device operation manager 102) in providing device health management services for a data processing system (e.g., data processing system 100A).

To provide device health management services, an inference model may be used to generate inferences which may be used to (i) monitor for changes in device health, (ii) predict when hardware resources are at risk of failing, and/or (iii) detect hardware resource failure of data processing system 100A. To perform its functionality, the inference model may be trained using diagnostic data for data processing system 100A collected during manufacturing of data processing system 100A to determine a baseline. The diagnostic data may include (i) data regarding performance metrics based on operation of the hardware resources (e.g., response times, latency, error rates), (ii) data regarding hardware resource utilization metrics (e.g., central processing unit (CPU) usage, memory usage), (iii) data regarding hardware resource health (e.g., heat output, number of damaged disk sectors), and/or (iv) other data which may be used to monitor the health of data processing system 100A.

The diagnostic data used to train the inference model may be obtained by management controller 152 of data processing system 100A. Management controller 152 may obtain the diagnostic data from hardware resources 150 at interaction 200. Management controller 152 may obtain the diagnostic data (i) after initiating a request for the diagnostic data from hardware resources 150, (ii) automatically from hardware resources 150 after detection of a change in the diagnostic data, (iii) via a publish-subscribe system where management controller 152 subscribes to updates from hardware resources 150 regarding the diagnostic data, and/or (iv) via other methods. Management controller 152 may directly read the data from storage devices of hardware resources 150 using block level reads, or may use an agent hosted by hardware resources 150 that may support file-level reads.

Management controller 152 may provide the diagnostic data to network module 160 at interaction 202 via an out-of-band communication channel. Network module 160 may provide the diagnostic data to device operation manager 102 via an out-of-band communication channel at interaction 204.

Device operation manager 102 may use the diagnostic data to perform data aggregation process 206. During data aggregation process 206, device operation manager 102 may collect diagnostic data for data processing system 100A during manufacturing (e.g., while data processing system 100A is at a factory). Device operation manager 102 may (i) combine the diagnostic data, (ii) fill gaps in the diagnostic data, (iii) transform the diagnostic data, (iv) extract values from the diagnostic data, and/or (v) perform other tasks to prepare the diagnostic data to be used as a training dataset for an inference model. For example, the training data may associate health indicators with corresponding labels (e.g., baseline health indicators).

The training dataset may then be used by device operation manager 102 to perform inference model training process 208. During inference model training process 208, an inference model may be selected (e.g., machine learning, decision tree, linear regression) and the training dataset may define goals for inferences made by the inference model. Parameters of the inference model may be selected using an optimization process (e.g., an objective function may be defined in terms of the training dataset and inferences made by the inference model, and a global optimization method such as the gradient descent may be used to identify parameters that most faithfully reproduce the trends in the training dataset). In doing so, an inference model may be trained using the diagnostic data collected during manufacturing to establish a baseline for data processing system 100A.

While described with respect to supervised learning, it will be appreciated that semi and/or self-supervised learning may be performed without departing from embodiments disclosed herein. For example, the health indicators may be clustered to obtain clusters associated with typical health indicators, and distances between new health indicators and the clusters may be calculated and compared to a threshold to identify whether the health indicators are likely anomalous or not anomalous.

Once the inference model establishes a baseline for data processing system 100A based on diagnostic data collected during manufacturing of data processing system 100A, the baseline may continue to be refined using diagnostic data collected after manufacturing of data processing system 100A. For example, first diagnostic data used to train the inference model may be collected during manufacturing at a factory and may include data regarding response times (e.g., the total amount of time needed for data processing system 100A to read data from storage). The first diagnostic data collected at the factory may be obtained under ideal conditions (e.g., temperature controlled, while the data processing system does not have other applications running, while the data processing system does not have a large amount of data in storage). Thus, the first diagnostic data and resulting first baseline may not accurately reflect the baseline for the data processing system under real world conditions (e.g., baseline response times may be slower while the data processing system is being used by a user). To obtain a more accurate second baseline, the inference model may continue to be trained for a duration of time using second diagnostic data collected after manufacturing.

Once the parameters of the inference model are set, the inference model may be used to generate inferences. For example, the inference model may be used to generate inferences regarding the anomalousness of third diagnostic data from the data processing system, the anomalousness indicating a deviation of the third diagnostic data from the second baseline. Deviation of the third diagnostic data from the second baseline may indicate a hardware resource of data processing system 100A has an increased likelihood of becoming impaired (e.g., losing a portion of functionality, not operating in a desired manner).

In addition to generating inferences, the inference model may generate confidence intervals, the confidence intervals indicating a level of uncertainty in an inference. The confidence intervals may be used to evaluate the inferences regarding the anomalousness of the diagnostic data.

Thus, as shown in FIG. 2A, an inference model may be trained using first diagnostic data collected during manufacturing of a data processing system to establish a first baseline for the data processing system. The first baseline may be updated (e.g., to obtain a second baseline) using second diagnostic data collected after manufacturing of the data processing system to increase the likelihood of the second baseline accurately reflecting health indicators for the data processing system while the data processing system is being used by a user. The inference model may generate inferences based on diagnostic data obtained from a management controller of the data processing system via out-of-band communication channels regarding a level of anomalousness of the diagnostic data with respect to the second baseline.

Turning to FIG. 2B, a second interaction diagram in accordance with an embodiment is shown. The second interaction diagram may illustrate processes and interactions that may be used to reduce a likelihood that a hardware resource of a data processing system becomes impaired using an inference model hosted by a device operation manager (e.g., device operation manager 102).

To reduce the likelihood that the hardware resource becomes impaired, diagnostic data for data processing system 100A may be provided to device operation manager 102 via out-of-band methods. To provide the diagnostic data to device operation manager 102, management controller 152 may obtain diagnostic data for data processing system 100A from hardware resources 150 at interaction 220. Refer to FIG. 2A for additional details regarding obtaining the diagnostic data from hardware resources 150. Management controller 152 may provide the diagnostic data to network module 160 at interaction 222 via an out-of-band communication channel. Network module 160 may provide the diagnostic data to device operation manager 102 at interaction 224 via an out-of-band communication channel.

For example, hardware resources 150 of data processing system 100A may include a central processing unit (CPU). The CPU may participate in the operation of data processing system 100A by (i) obtaining computing instructions, (ii) interpreting the computing instructions, (iii) executing the computing instructions (e.g., performing calculations, manipulating data, transferring data), (iv) storing data in memory, and/or (v) performing other tasks related to facilitating the operation of data processing system 100A.

Hardware resources 150 may publish diagnostic data including data regarding the CPU to management controller 152 based on a schedule (e.g., once per day). Management controller 152 may provide the diagnostic data to a device operation manager responsible for providing device health management services for data processing system 100A (e.g., device operation manager 102) via network module 160. The diagnostic data may include data indicating the CPU usage has remained high (e.g., at 100%) for several days, even though a user of data processing system 100A has not been logged into data processing system 100A and no applications are running.

The diagnostic data may be used by the inference model hosted by device operation manager 102 to perform health monitoring and failure detection process 226. During health monitoring and failure detection process 226, the inference model may generate inferences regarding the level of anomalousness of the diagnostic data. Refer to FIG. 2A for additional details regarding the inferences generated by the inference model.

Management controller 152 may obtain a response from device operation manager 102 based on the inference model. To obtain the response, device operation manager 102 may provide the response to network module 160 at interaction 228. The response may then be provided to management controller 152 at interaction 230. The response may include (i) inferences generated by the inference model indicating a level of anomalousness of the diagnostic data with respect to a baseline for data processing system 100A, (ii) a level of confidence in the inferences, and/or (iii) other data used to provide the device health management services. Refer to FIG. 2A for details regarding obtaining the baseline for data processing system 100A.

Continuing with the above example, the inference model hosted by device operation manager 102 may use the diagnostic data for data processing system 100A to generate inferences. For example, the inference model may generate inferences identifying that the CPU usage data is anomalous based on the baseline for data processing system 100A. Device operation manager 102 may issue a response to management controller 152 including the inferences and a level of confidence in the inferences.

Management controller 152 may use the response to perform device management process 232. During device management process 232, management controller 152 may compare the level of anomalousness and the level of confidence in the level of anomalousness from the response to criteria. The criteria may indicate a threshold level of anomalousness for comparison to an inference from the response, and the inference, when meeting the threshold level of anomalousness, may indicate that data processing system 100A is likely to suffer from undesired operation in the future. The criteria may include a plurality of threshold levels of anomalousness. For example, increasing threshold levels of anomalousness may indicate increasing degrees of severity of the impact on operation of data processing system 100A, which may require different responses from management controller 152.

Continuing with the above example, management controller 152 may obtain the response from device operation manager 102 including inferences indicating the level of anomalousness of the data regarding the CPU usage. Management controller 152 may use criteria to determine that the level of anomalousness of the data regarding the CPU usage meets a threshold level of anomalousness, which may indicate that the CPU is at risk of becoming impaired. The CPU becoming impaired may (i) slow the operation of data processing system 100A, (ii) lead to system crashes, (iii) cause the CPU to overheat, and/or (iv) result in other outcomes which may negatively impact the operation of data processing system 100A.

If management controller 152 determines the response meets the criteria, management controller 152 may obtain an action set for updating the operation of data processing system 100A. Obtaining the action set may include (i) receiving the action set from another device (e.g., device operation manager 102), (ii) reading the action set from storage, and/or (iii) other methods. Each threshold level of anomalousness of the plurality of threshold levels of anomalousness may be associated with at least one action, and the action set may be established based on a portion of the plurality of threshold levels of anomalousness that are met by the diagnostic data. Such associations and actions may be established via a manual process (e.g., subject matter expert defined), a semi-automated process (e.g., statistical analysis of operating history may be used to identify potential remediation action with a subject matter expert reviewing/approving the associations/actions identified via the automated process), and/or a fully-automated process (e.g., analysis of past operational history may be used to identify the associations/actions without subject matter expert review).

Once the action set for updating the operation of data processing system 100A has been obtained, management controller 152 may perform the action set to reduce a likelihood that a hardware resource becomes impaired. The action set may include (i) generating a notification to alert a user of data processing system 100A to the level of anomalousness indicated by the diagnostic data, (ii) moving data stored on a hardware resource indicated in an inference from the response as exhibiting a level of anomalousness to a hardware resource not exhibiting a level of anomalousness, (iii) providing a copy of the data stored on the hardware resource indicated in an inference from the response as exhibiting a level of anomalousness to the device operation manager (e.g., device operation manager 102), (iv) modifying use of the hardware resource indicated in an inference from the response as exhibiting a level of anomalousness, and/or (v) other actions to manage the health of data processing system 100A to improve a likelihood of the data processing system being able to continue to provide desired computer implemented services in the future.

Management controller 152 may perform the action set by providing updates to hardware resources 150 at interaction 234. Hardware resources 150 may use the updates to perform operation updating process 236. During operation updating process 236, hardware resources 150 may update an existing operating state of data processing system 100A to a new operating state of data processing system 100A.

Continuing with the above example, management controller 152 may use the criteria to determine that the level of anomalousness of the CPU usage meets a high threshold level of anomalousness. The high CPU usage may meet a high threshold level of anomalousness due to the severity of the impact to the operation of data processing system 100A if immediate actions are not performed. For example, high CPU usage may cause the CPU to overheat, which may lead to permanent damages (e.g., burning, melting), resulting in CPU failure. CPU failure may cause data processing system 100A to become inoperable. To prevent the CPU from overheating, management controller 152 may perform actions from the action set keyed to the high threshold level of anomalousness of the CPU data. For example, management controller 152 may shut down data processing system 100A. Upon start up, management controller 152 may generate an auditory and/or visual notification to alert the user of data processing system 100A to the anomalous CPU usage. In doing so, management controller 152 may reduce the likelihood that the CPU overheats until the user can determine a cause for the high CPU usage (e.g., malware running on data processing system 100A).

Thus, as shown in FIG. 2B, a device operation manager (e.g., device operation manager 102) may use an inference model to detect a level of anomalousness indicated by diagnostic data for a data processing system. If the level of anomalousness meets criteria, an action set may be performed by a management controller of the data processing system depending on the threshold level of anomalousness met by the diagnostic data. Performing the action set may reduce a likelihood that a hardware resource of the data processing system becomes impaired.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2B may perform various methods to manage the device health of data processing systems. FIG. 3 illustrates a method that may be performed by the components of the system of FIGS. 1A-2B. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system, any component of a data processing system (e.g., a management controller, hardware resources) and/or another device.

Turning to FIG. 3, a flow diagram illustrating a method of managing a data processing system in accordance with an embodiment is shown. The method may be performed, for example, by a data processing system, a device operation manager, a communication system, a management controller of a data processing system, hardware resources of a data processing system, and/or any other entity without departing from embodiments disclosed herein.

At operation 300, a management controller of a data processing system may obtain diagnostic data from hardware resources of the data processing system. Obtaining the diagnostic data may include (i) receiving the diagnostic data from the hardware resources via a message, (ii) reading the diagnostic data from a storage location used by the hardware resources to store diagnostic data, (iii) communicating the diagnostic data via a publish-subscribe system where the management controller subscribes to updates regarding diagnostic data from the hardware resources, (iv) selectively powering the hardware resources by the management controller while the hardware resources are unpowered (e.g., collecting diagnostic data from a hardware resource while other hardware resources are unpowered, collecting diagnostic data from a hardware resource while selected hardware resources are powered), and/or (v) other methods.

At operation 302, the management controller may provide the diagnostic data to a device operation manager. Providing the diagnostic data to a device operation manager may include (i) providing the diagnostic data obtained by the management controller to a network module of the data processing system via out-of-band methods, (ii) transmitting the diagnostic data from the network module to the device operation manager via out-of-band methods, (iii) storing the diagnostic data in a storage location that will be checked by the device operation manager in the future, and/or (iv) other methods.

At operation 304, the management controller may obtain a response from the device operation manager based on the diagnostic data. The response may indicate a level of anomalousness of the diagnostic data with respect to a baseline for the data processing system. Obtaining the response may include (i) generating the response by the device operation manager, (ii) receiving the response from the device operation manager via out-of-band methods, (iii) reading the response from a storage location used by the device operation manager to store responses, and/or (iv) other methods.

Generating the response by the device operation manager may include (i) training an inference model hosted by the device operation manager using diagnostic data collected during manufacturing of the data processing system to establish a baseline for the data processing system (e.g., collecting diagnostic data during manufacturing, providing the diagnostic data to the inference model as ingest), (ii) updating the baseline for the data processing system over a duration of time based on diagnostic data collected after manufacturing of the data processing system (e.g., collecting diagnostic data while the data processing system is being used by a user, providing the diagnostic data to the inference model as ingest to establish an updated baseline), (iii) generating inferences using the inference model regarding the anomalousness of the diagnostic data, the anomalousness indicating a deviation of the diagnostic data from the baseline (e.g., comparing the diagnostic data to the baseline, determining whether the diagnostic data deviates from the baseline), and/or (iv) other methods.

At operation 306, a determination may be made regarding whether the level of anomalousness meets criteria. Making the determination may include (i) obtaining criteria, the criteria indicating a plurality of threshold levels of anomalousness for comparison to an inference from the response, (ii) comparing the level of anomalousness indicated by an inference from the response to a threshold level of the plurality of threshold levels of anomalousness indicated by the criteria, and/or (iii) other methods.

If it is determined that the level of anomalousness meets criteria (e.g., the determination is "Yes" at operation 306), then the method may proceed to operation 308.

At operation 308, the management controller may obtain an action set for updating the operation of the data processing system. Obtaining the action set may include (i) receiving the action set from another device, (ii) reading the action set from storage, (iii) dynamically generating the action set based on any number of factors, and/or (iv) other methods.

At operation 310, the management controller may perform the action set to update an existing operating state of the data processing system to a new operating state of the data processing system to reduce a likelihood that a hardware resource of the hardware resources becomes impaired. Performing the action set may include (i) generating a notification to alert a user of the data processing system to the level of anomalousness indicated by the diagnostic data (e.g., powering a speaker to generate an auditory notification, displaying a visual notification on a display), (ii) moving data stored on a hardware resource indicated in an inference from the response as exhibiting a level of anomalousness to a hardware resource not exhibiting a level of anomalousness (e.g., transferring data to an uncompromised hardware resource), (iii) providing a copy of the data stored on the hardware resource indicated in an inference from the response as exhibiting a level of anomalousness to the device operation manager (e.g., making a copy of the data, providing the copy of the data to a server), (iv) modifying use of the hardware resource indicated in an inference from the response as exhibiting a level of anomalousness (e.g., not using portions of the hardware resource that are compromised, discontinuing use of a compromised hardware resource), and/or (v) other actions.

The method may end following operation 310.

Returning to operation 306, if it is determined that the level of anomalousness does not meet criteria (e.g., the determination is "No" at operation 306), then the method may proceed to operation 312.

At operation 312, operation of the data processing system may continue in the existing operating state (e.g., by not making any changes to the data processing system based on the diagnostic data provided by the data processing system).

The method may end following operation 312.

Using the methods illustrated in FIG. 3, embodiments disclosed herein may provide systems and methods usable to provide device health management services for a data processing system via out-of-band methods.

Figure 4:
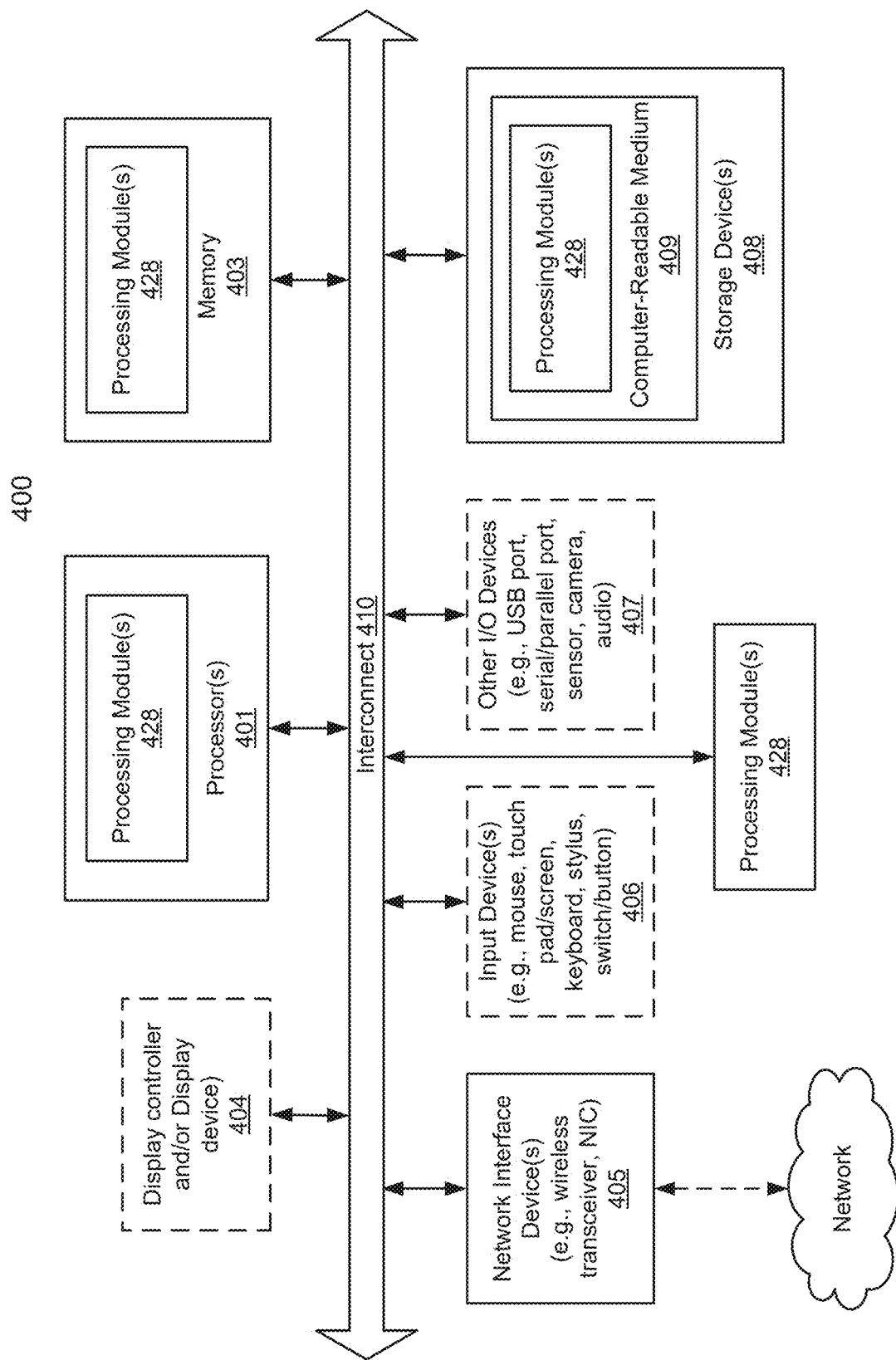
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
    obtaining, by a management controller of the data processing system from hardware resources of the data processing system, diagnostic data, wherein the data processing system comprises a network module adapted to separately advertise network endpoints for the management controller and the hardware resources of the data processing system, the network endpoints being usable to address communications to the hardware resources using an in-band communication channel and the management controller using an out-of-band communication channel;
    providing, by the management controller, the diagnostic data to a device operation manager;
    obtaining, by the management controller, a response from the device operation manager based on the diagnostic data, the response indicating a level of anomalousness of the diagnostic data with respect to a baseline for the data processing system; and
    in a first instance of the obtaining where the level of anomalousness meets criteria:
        obtaining, by the management controller, an action set for updating the operation of the data processing system; and
        performing, by the management controller, the action set to update an existing operating state of the data processing system to a new operating state of the data processing system to reduce a likelihood that a hardware resource of the hardware resources becomes impaired.

2. The method of claim 1, wherein the diagnostic data comprises at least one type of data selected from a list of types of data consisting of:
    data regarding performance metrics based on operation of the hardware resources;
    data regarding hardware resource utilization metrics; and
    data regarding hardware resource health.

3. The method of claim 1, wherein obtaining the diagnostic data comprises selectively powering the hardware resources by the management controller while the hardware resources are unpowered.

4. The method of claim 1, wherein the response is based on an inference model, and the inference model is based on the baseline for the data processing system using second diagnostic data collected during manufacturing of the data processing system.

5. The method of claim 4, wherein the baseline for the data processing system is updated over a duration of time based on third diagnostic data collected after manufacturing of the data processing system.

6. The method of claim 4, wherein the inference model is trained to generate inferences regarding the anomalousness of the diagnostic data from the data processing system, the anomalousness indicating a deviation of the diagnostic data from the baseline.

7. The method of claim 1, wherein the criteria indicate a threshold level of anomalousness for comparison to an inference from the response, and the inference, when meeting the threshold level of anomalousness, indicates that the data processing system is likely to suffer from undesired operation in the future.

8. The method of claim 7, wherein the criteria comprise a plurality of threshold levels of anomalousness, and each threshold level of anomalousness of the plurality of threshold levels of anomalousness is associated with at least one action, and the action set is established based on a portion of the plurality of threshold levels of anomalousness that are met by the diagnostic data.

9. The method of claim 1, wherein the action set comprises at least one action selected from a group of actions consisting of:
   generating a notification to alert a user of the data processing system to the level of anomalousness indicated by the diagnostic data;
   moving data stored on a hardware resource indicated in an inference from the response as exhibiting a level of anomalousness to a hardware resource not exhibiting a level of anomalousness;
   providing a copy of the data stored on the hardware resource indicated in an inference from the response as exhibiting a level of anomalousness to the device operation manager; and
   modifying use of the hardware resource indicated in an inference from the response as exhibiting a level of anomalousness.

10. The method of claim 1, wherein the management controller and the network module are on separate power domains from the hardware resources so that the management controller and the network module are operable while the hardware resources are inoperable.

11. The method of claim 1, wherein the out-of-band communication channel runs through the network module, and the in-band communication channel that services the hardware resources also runs through the network module.

12. The method of claim 1, wherein the network module hosts a transmission control protocol/internet protocol (TCP/IP) stack to facilitate network communications via the out-of-band communication channel.

13. A non-transitory machine-readable medium having instructions stored therein, which when executed by a processor, cause the processor to perform operations for managing operation of a data processing system, the operations comprising:
   obtaining, by a management controller of the data processing system from hardware resources of the data processing system, diagnostic data, wherein the data processing system comprises a network module adapted to separately advertise network endpoints for the management controller and the hardware resources of the data processing system, the network endpoints being usable to address communications to the hardware resources using an in-band communication channel and the management controller using an out-of-band communication channel;
   providing, by the management controller, the diagnostic data to a device operation manager;
   obtaining, by the management controller, a response from the device operation manager based on the diagnostic data, the response indicating a level of anomalousness of the diagnostic data with respect to a baseline for the data processing system; and
   in a first instance of the obtaining where the level of anomalousness meets criteria:
      obtaining, by the management controller, an action set for updating the operation of the data processing system; and
      performing, by the management controller, the action set to update an existing operating state of the data processing system to a new operating state of the data processing system to reduce a likelihood that a hardware resource of the hardware resources becomes impaired.

14. The non-transitory machine-readable medium of claim 13, wherein the diagnostic data comprises at least one type of data selected from a list of types of data consisting of:
   data regarding performance metrics based on operation of the hardware resources;
   data regarding hardware resource utilization metrics; and
   data regarding hardware resource health.

15. The non-transitory machine-readable medium of claim 13, wherein obtaining the diagnostic data comprises selectively powering the hardware resources by the management controller while the hardware resources are unpowered.

16. The non-transitory machine-readable medium of claim 13, wherein the response is based on an inference model, and the inference model is based on the baseline for the data processing system using second diagnostic data collected during manufacturing of the data processing system.

17. A data processing system, comprising:
   a processor; and
   a memory coupled to the processor to store instructions, which when executed by the processor, cause the processor to perform operations for managing operation of a data processing system, the operations comprising:
      obtaining, by a management controller of the data processing system from hardware resources of the data processing system, diagnostic data, wherein the data processing system comprises a network module adapted to separately advertise network endpoints for the management controller and the hardware resources of the data processing system, the network endpoints being usable to address communications to the hardware resources using an in-band communication channel and the management controller using an out-of-band communication channel;
      providing, by the management controller, the diagnostic data to a device operation manager;
      obtaining, by the management controller, a response from the device operation manager based on the diagnostic data, the response indicating a level of anomalousness of the diagnostic data with respect to a baseline for the data processing system; and in a first instance of the obtaining where the level of anomalousness meets criteria:
obtaining, by the management controller, an action set for updating the operation of the data processing system; and
performing, by the management controller, the action set to update an existing operating state of the data processing system to a new operating state of the data processing system to reduce a likelihood that a hardware resource of the hardware resources becomes impaired.

18. The data processing system of claim 17, wherein the diagnostic data comprises at least one type of data selected from a list of types of data consisting of:
data regarding performance metrics based on operation of the hardware resources;
data regarding hardware resource utilization metrics; and
data regarding hardware resource health.

19. The data processing system of claim 17, wherein obtaining the diagnostic data comprises selectively powering the hardware resources by the management controller while the hardware resources are unpowered.

20. The data processing system of claim 17, wherein the management controller and the network module are on separate power domains from the hardware resources so that the management controller and the network module are operable while the hardware resources are inoperable.

* * * * *